US006418912B1

(12) United States Patent
Lorraine

(10) Patent No.: US 6,418,912 B1
(45) Date of Patent: Jul. 16, 2002

(54) HPDI INJECTOR AND PACKAGING

(75) Inventor: Jack R. Lorraine, Newport News, VA (US)

(73) Assignee: Siemens Automotive Corporation, Auburn Hills, MI (US)

(*) Notice: Subject to any disclaimer, the term of this patent is extended or adjusted under 35 U.S.C. 154(b) by 18 days.

(21) Appl. No.: 09/739,562

(22) Filed: Dec. 18, 2000

(51) Int. Cl.[7] .......................... F02M 51/00; F16K 31/06

(52) U.S. Cl. ................ 123/470; 239/533.2; 239/585.1; 239/600

(58) Field of Search ................................ 123/456, 470, 123/472; 239/533.2–533.9, 533.11, 533.12, 584, 585.1–585.5, 600; 251/129.01, 129.15; 439/130

(56) References Cited

U.S. PATENT DOCUMENTS

| | | | | |
|---|---|---|---|---|
| 5,016,594 A | | 5/1991 | Hafner et al. | 123/470 |
| 5,140,963 A | | 8/1992 | Brackett et al. | 123/470 |
| 5,203,304 A | | 4/1993 | Hafner et al. | 123/456 |
| 5,226,391 A | | 7/1993 | Gras et al. | 123/456 |
| 5,295,468 A | | 3/1994 | Blessing et al. | 123/456 |
| 5,299,542 A | | 4/1994 | Hafner | 123/470 |
| 5,312,050 A | * | 5/1994 | Schumann et al. | 239/585.1 |
| 5,323,749 A | | 6/1994 | Gras et al. | 123/470 |
| 5,465,910 A | * | 11/1995 | Hall et al. | 239/585.4 |
| 5,616,037 A | | 4/1997 | Lorraine et al. | 439/130 |
| 5,738,284 A | * | 4/1998 | Gruendl et al. | 239/585.4 |
| 5,803,052 A | | 9/1998 | Lorraine et al. | 123/470 |
| 5,934,253 A | | 8/1999 | Kojima et al. | 123/470 |
| 6,012,655 A | * | 1/2000 | Maier | 239/585.4 |

* cited by examiner

*Primary Examiner*—Tony M. Argenbright

(57) ABSTRACT

A fuel supply assembly includes an electrically actuatable fuel injector having a first end, a longitudinal axis, and a fuel channel extending generally along the longitudinal axis. The fuel injector also includes a dielectric overmold including first and second electrical contact rings disposed about an outer perimeter of the overmold. The dielectric overmold extends downstream of the first end. The assembly also includes a dielectric connector shell generally surrounding at least part of the overmold. The assembly also includes an injector cup disposed over the fuel injector upstream of the overmold between the fuel injector and the connector shell. The injector cup includes a first end, a second end juxtaposed from the first end, and a generally longitudinal cup channel extending from the first end toward the second end. The longitudinal channel is in fluid communication with the fuel channel. Methods of installing and removing the assembly are also provided.

24 Claims, 7 Drawing Sheets

HPDI INJECTOR AND PACKAGING

FIELD OF THE INVENTION

The present invention relates to a fuel injector for an internal combustion engine and connection features of the injector with fuel and electrical supplies, as well as with the engine.

BACKGROUND OF THE INVENTION

Known HPDI fuel injectors require a forged or machined fuel rail that has to retain the injector as well as provide for fuel and electrical connections to the injectors. Each of the known installation applications requires a unique design and special tooling. In moving to a fabricated fuel rail, it is desirable that the injector aligns and mounts directly to the head of the engine, reducing the accuracy requirement and eliminating the loading requirement of the rail. At the same time, the injector opening in the head could be simplified. Existing injectors require an opening into the head, and a larger opening to clear the body of the injector. In between these two openings, there is a transition zone which is aimed at helping lead in and locate the injector in the head. However, above the larger opening, there needs to be a breakout to provide room for the electrical connector. This breakout often provides design and installation problems for the head. Still further out, there needs to be room for the fuel rail which provides the support and location needs of the injector. At this location, the rail is often sandwiched between the runners of the intake manifold, making mounting and locating of a main gallery difficult to design and access.

It would be beneficial to provide a fuel injector which mounts directly to the head, and which minimizes the space requirements for insertion and removal for the fuel injector into and from the engine.

BRIEF SUMMARY OF THE INVENTION

Briefly, the present invention provides a fuel injector. The fuel injector comprises a first end, a second end and a longitudinal axis extending therethrough between the first end and the second end. The fuel injector also comprises a body extending along the longitudinal axis between the first end and the second end. The body includes a dielectric overmold. The fuel injector also comprises a first generally arcuate ring at least partially circumscribing the overmold. The first generally arcuate ring is adapted to electrically engage a first electrical contact.

Also, a fuel supply assembly is provided. The assembly includes an electrically actuatable fuel injector having a first end, a longitudinal axis, and a fuel channel extending generally along the longitudinal axis. The fuel injector also includes a dielectric overmold including first and second electrical contact rings disposed about an outer perimeter of the overmold. The dielectric overmold extends downstream of the first end. The assembly also includes a dielectric connector shell generally surrounding at least part of the overmold. The connector assembly has an outer perimeter and a first electrical contact extending generally longitudinally proximal to the outer perimeter. The first electrical contact has a first contact end extends outward from the longitudinal axis and a second contact end electrically engaging the first electrical contact ring. The assembly also includes an injector cup disposed over fuel injector upstream of the overmold between the fuel injector and the connector shell. The injector cup includes a first open cup end, a second cup end juxtaposed from the first open cup end, and a generally longitudinal cup channel extending from the first open cup end toward the second cup end. The longitudinal cup channel is in fluid communication with the fuel channel. The injector cup also includes a generally planar surface extending generally perpendicular to the longitudinal axis.

The present invention also comprises a method of removing a fuel supply assembly from an engine, the fuel supply assembly comprising a fuel injector, an injector cup, and a connector shell. The method comprises displacing the injector cup in a first direction along a longitudinal axis, the injector cup engaging a retainer ring and compressing the retainer ring toward the longitudinal axis, the retainer ring releasing the connector shell; displacing the connector shell in a second direction along the longitudinal axis; displacing the connector shell and the injector cup together in the second direction and removing the connector shell and the injector cup from the fuel injector; rotating the fuel injector about the longitudinal axis, disengaging the fuel injector from a retainer sleeve in the engine; and displacing the fuel injector in the second direction and removing the fuel injector from the engine.

The present invention also provides a fuel injector assembly insertable into an engine head having a head opening including sidewalls. The assembly comprises a fuel injector and a sleeve. The sleeve removably surrounds a lower portion of the fuel injector. The sleeve includes a plurality of retaining teeth extending outward from the fuel injector. The sleeve is insertable into the head opening such that the retaining teeth engage the sidewalls in the head opening. Additionally, when the sleeve is inserted into the head opening, the injector is rotatable relative to the sleeve such that the injector is removable from the sleeve, and the sleeve remains in the head opening.

BRIEF DESCRIPTION OF THE DRAWINGS

The accompanying drawings, which are incorporated herein, and constitute part of this specification, illustrate the presently preferred embodiments of the invention, and, together with the general description given above and the detailed description given below, serve to explain the features of the invention. In the drawings.

DETAILED DESCRIPTION OF THE PREFERRED EMBODIMENTS

Figure 1:
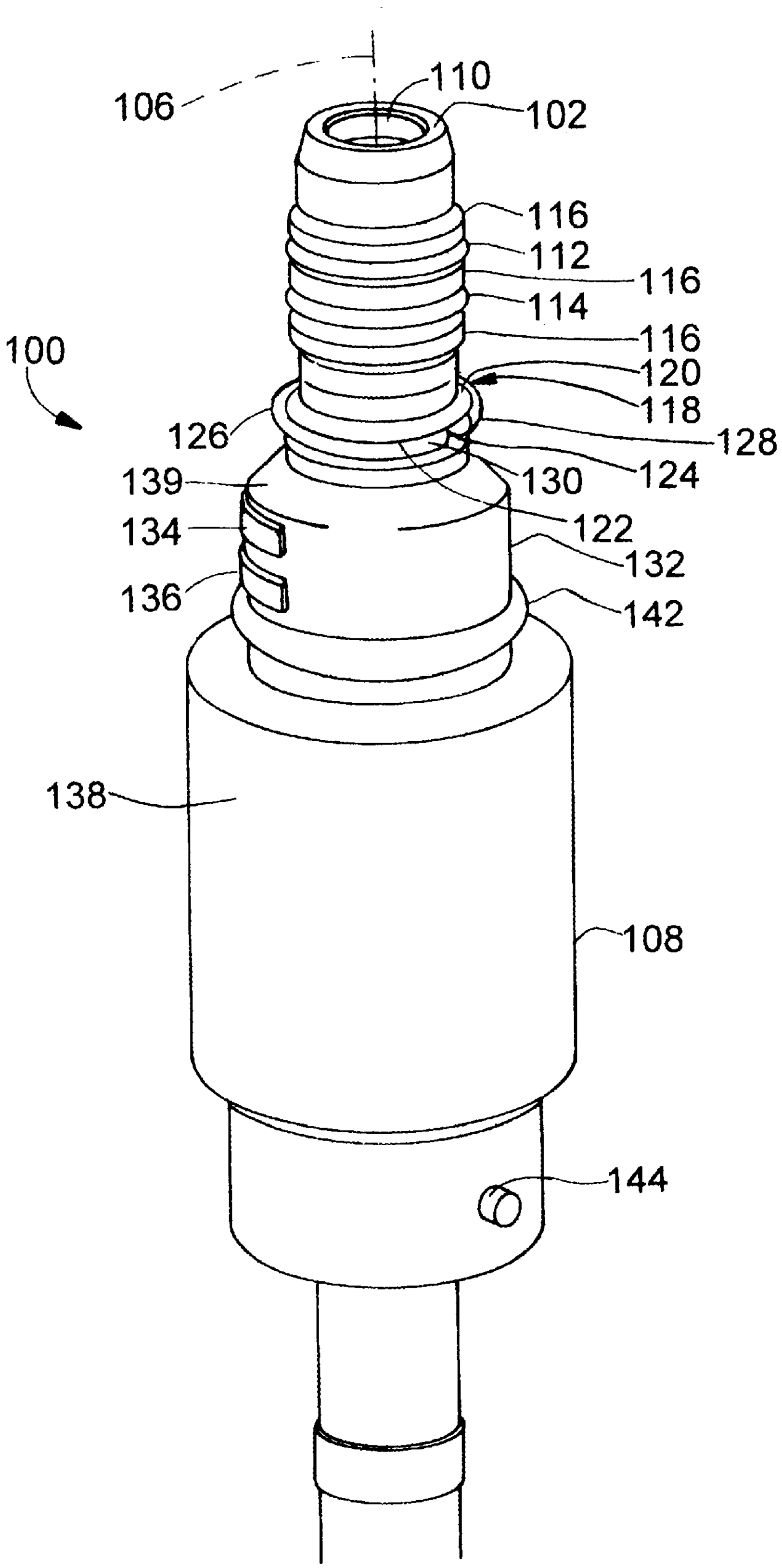
FIG. 1 is a perspective view of a fuel injector according to a preferred embodiment of the present invention.

A perspective view of a first embodiment of a high pressure direct injection (HPDI) fuel injector 100 for internal combustion engine applications according to a preferred embodiment is shown in FIG. 1. In the drawings, like numerals are used to indicate like elements throughout. A side profile view, partially in section, of a fuel supply assembly 10 in which the fuel injector 100 is used, is shown in section in FIG. 2. The fuel supply assembly 10 includes the injector 100, a connector shell 200, and an injector cup 300. The injector 100 includes an upstream end 102, a downstream end 104 distal from the first end 102, and a longitudinal axis 106 extending therethrough between the upstream end 102 and the downstream end 104. As used herein, the terms “upstream” and “downstream” refer to the source of fuel and the fuel delivery, respectively, of the drawing to which is being referred.

Figure 2:
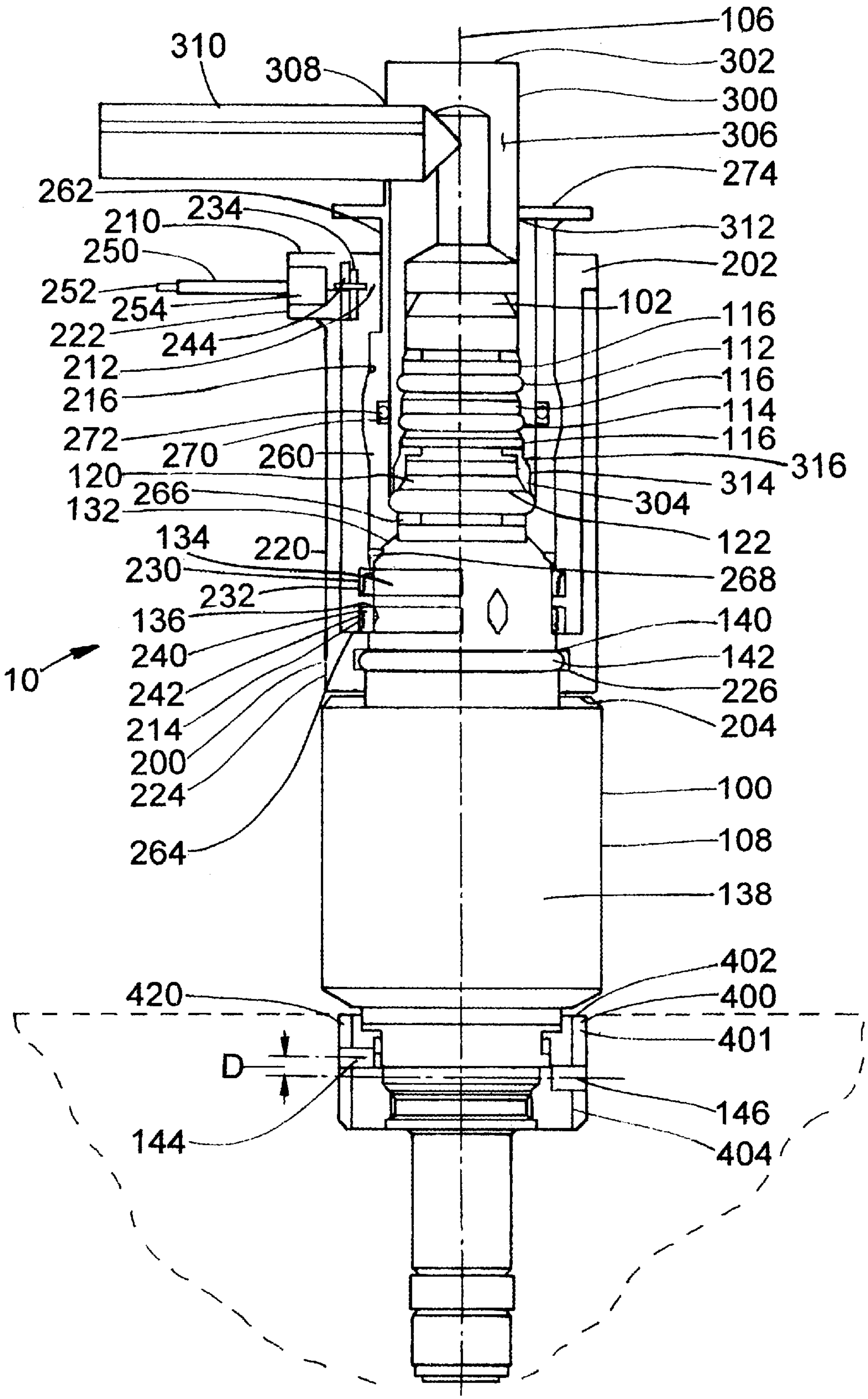
FIG. 2 is a side view, partially in section, of a fuel supply assembly according to the preferred embodiment.

As shown in FIGS. 1 and 2, the injector 100 further includes a body 108 which extends along the longitudinal axis 106 between the upstream end 102 and the downstream end 104. A fuel channel 110, forming a metering member, extends through the body 108 generally along the longitudinal axis 106. Fuel in provided to the fuel channel 110 at the upstream end 102 and flows through the injector 100 where the fuel is discharged from the downstream end 104.

The upstream end 102 of the fuel injector 100 also includes a plurality of sealing elements to seal the fuel cup 300 and the fuel injector 100 as will be discussed in more detail later herein. The sealing elements include a first o-ring 112 and a second o-ring 114 which circumscribes the upstream end 102. Preferably, the o-rings 112, 114 are of different materials which can expand the operative temperature range of the fuel injector 100. More preferably, the first o-ring 112 is made from nitrile and the second o-ring 114 is made from viton, although those skilled in the art will recognize that the o-rings 112, 114 can be made from other materials. Also, a plurality of back-up rings 116 for the o-rings 112, 114 are located at the upstream end 102, with a back-up ring 116 being located axially adjacent to each of the first and second o-rings 112, 114.

A retainer lip 118 circumscribes the body 108 downstream of the o-rings 112, 114. The retainer lip 118 includes a beveled face 120 which extends downstream and away from the longitudinal axis 106, and a retaining face 122 which extends generally downstream and toward the longitudinal axis 106. A groove 124 circumscribes the body 108 immediately downstream of retainer lip 118. A retainer clip 126 is located at least partially within the groove 124. The retainer clip 126 is generally C-shaped, having a first end 128 and a second end 130. The retainer clip 126 is preferably constructed from a spring-type material so that the first end 128 is biased away from the second end 130, opening the retainer clip 126. Additionally, the retainer clip 126 extends partially exteriorly from the groove 124 for reasons that will be explained.

Figure 3:
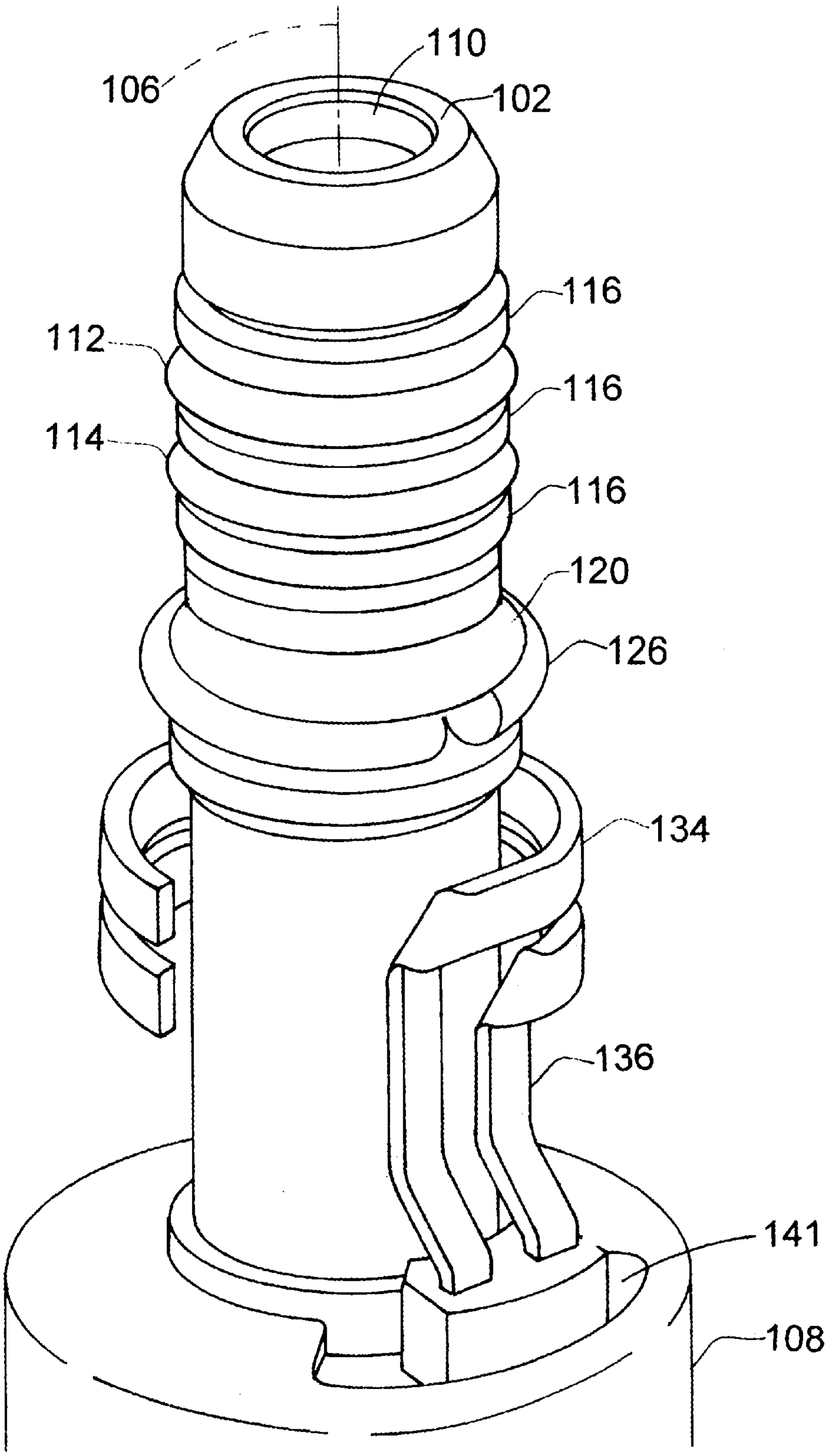
FIG. 3 is a perspective view of the top portion of the fuel injector with part of the overmold removed.

The body 108 includes a dielectric overmold 132 downstream of the groove 124, which at least partially cinctures the fuel metering member, or fuel channel 110. The overmold 132 includes first and second electrical generally annular contacts 134, 136, respectively, which are molded into the overmold 132. As shown in FIG. 3, the electrical contacts 134, 136 are each electrically connected to a solenoid 138 which is located generally within the overmold 132. Preferably, the electrical contacts 134, 136 circumscribe an arc of approximately 270 degrees around the outer circumference of the overmold 132. Preferably, a void 141 is present in the overmold 132 in the portion of the overmold 132 not circumscribed by the electrical contacts 134, 136. The void 141 acts as an orientation key during installation of the injector 100 into the engine head, shown in dashed lines in FIG. 2. An upstream surface 139 of the overmold 132 is tapered downstream and away from the longitudinal axis 106.

Referring back to FIGS. 1 and 2, a groove 140, which circumscribes the overmold 132, is located downstream of the contacts 134, 136. A sealing element, preferably an o-ring 142, is seated in the groove 140. The o-ring 142 provides a hermetic seal between the injector 100 and the connector shell 200, as will be discussed in more detail later herein.

Figure 4:
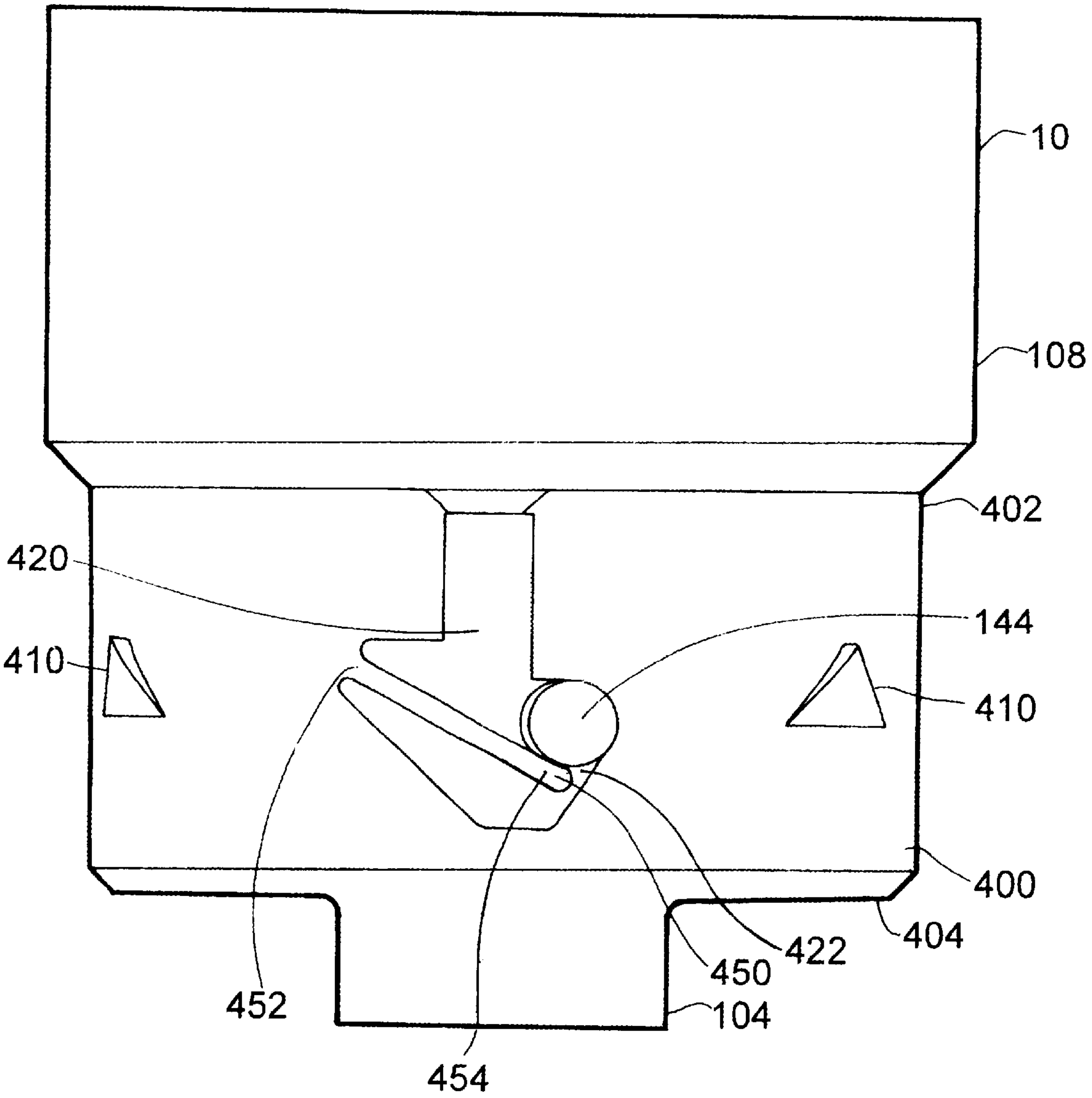
FIG. 4 is side view of a portion of the fuel injector connected to a retaining sleeve.

A plurality of retaining pins 144, 146 extend radially outward from the downstream end 104 of the fuel injector 100, downstream of the overmold 132. The retaining pins 144, 146 engage a retaining sleeve 400, shown enlarged in FIG. 4. The interrelation of the fuel injector 100 with the retaining sleeve 400 will be described in more detail later herein. Preferably, the retaining pins 144, 146 are located in different transverse planes relative to the longitudinal axis 106, that are separated by a vertical distance “D”, for reasons that will be explained later herein. Also preferably, the retaining pins 144, 146 are located 180 degrees apart from each other around the circumference of the downstream end 104 of the fuel injector 100, although those skilled in the art will recognize that the retaining pins 144, 146 can be spaced other distances as well.

Figure 2A:
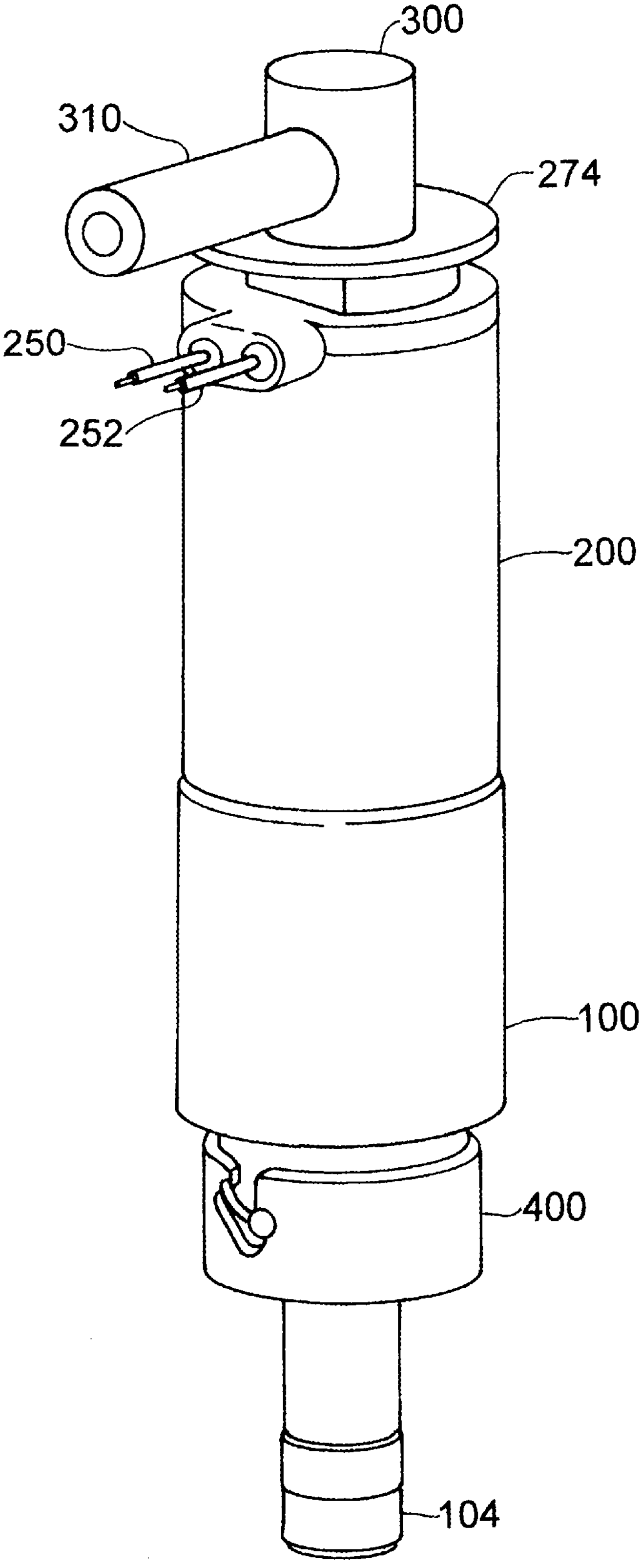
FIG. 2A is a perspective view of the fuel supply assembly.

The connector shell 200, shown in section in FIG. 2, has a first end 202 and a second end 204 and includes an inner housing 210, which generally circumscribes at least part of the overmold 132. The inner housing 210 has an upstream end 212 and a downstream end 214. The connector shell 200 also includes an outer housing 220, which generally circumscribes the inner housing 210 from the upstream end 102 of the fuel injector 100 to a location downstream of the o-ring 142. The outer housing 220 has an upstream end 222 and a downstream end 224. First and second shell contacts 230, 240 are longitudinally disposed within the connector shell 200, between the inner housing 210 and the outer housing 220. With the connector shell 200 engaged with the fuel injector 100, a first end 232 of the first shell contact 230 is electrically engaged with the first electrical contact 134, and a first end 242 of the second shell contact 240 is electrically engaged with the second electrical contact 136. A second end 234 of the first shell contact 230 is electrically connected to a first wire 250 and a second end 244 of the second shell contact 240 is electrically connected to a second wire 252 (shown in detail in FIG. 2A). The wires 250, 252 extend from the first end 202 of the connector shell 200 between the inner housing 210 and the outer housing 220. A wire seal 254 seals any opening between the inner housing 210 and the outer housing 220 where the wires 250, 252 exit the connector shell 200. Preferably, the wires 250, 252 exit the connector shell 200 at a 90 degree angle to the longitudinal axis 106, although those skilled in the art will recognize that the wires 250, 252 can exit the connector shell 200 at other angles as well.

The inner housing 210 also includes a circumferential groove 216 which circumscribes an internal diameter of the inner housing 210. A retainer sleeve 260 is press fit into the groove 216. The retainer sleeve 260 has a first end 262 which extends upstream of the first end 212 of the inner housing 210, and a second end 264 which extends between the groove 124 in the fuel injector body 108 and the first electrical contact 134. The second end 264 is preferably tapered to conform to the taper of the upstream surface 139 of the overmold 132. A projection 266 extends from the second end 264 above the taper inward toward the longitudinal axis 106. The projection 266 engages the retainer clip 126 and releasably retains the connector shell 200 onto the fuel injector 100, as will be discussed in more detail later herein. The projection 266 includes a tapered surface 268 which extends downstream and toward the longitudinal axis 106. The retainer clip 126 is preferably at least partially seated on the tapered surface 268.

A groove 270 is cut into the interior perimeter of the retainer sleeve 260 upstream of the projection 266. The groove 270 seats a seal 272, preferably an o-ring. The seal 272 seals a gap between the retainer sleeve 260 and the injector cup 300 in the final assembly.

A retaining surface or clip 274 is fixedly connected to the first end 262 of the retainer sleeve 260. Preferably, the retaining clip 274 is generally "U-shaped" and is welded to the retainer sleeve 260. An interior portion of the retaining clip 274 engages the injector cup 300, as will be described in more detail later herein. An exterior portion of the retaining clip 274 extends beyond the outer perimeter of the retainer sleeve 260.

The downstream end 224 of the outer housing 220 includes a tapered portion which tapers downstream and away from the longitudinal axis 106. The outer housing 220 also includes a groove 226 in the internal perimeter of the outer housing 220, upstream from the taper and juxtaposed from the groove 140 in the overmold 132. The o-ring 142 engages the groove 226, forming a hermetic seal between the outer housing 220 and the overmold 132.

The injector cup 300 is inserted over the upstream end 102 of the fuel injector 100 upstream of the overmold 132 and within the interior perimeter of the connector shell 200, and more specifically, generally within the interior perimeter of the retainer sleeve 260. The injector cup 300 includes a sealed upstream end 302 and an open downstream end 304, juxtaposed from the upstream end 302. A generally longitudinal cup channel 306 extends along the longitudinal axis 106 of the fuel injector 100 from the open downstream end 304 toward the upstream end 302 and is in fluid communication with the fuel channel 110 in the fuel injector 100. The upstream end 302 includes a generally radial opening 308 which is in fluid communication with the cup channel 306. A fuel supply conduit 310 is hermetically sealed to the opening 308 so that fuel supplied to the injector 100 from the fuel supply conduit 310 flows through the conduit 310 and the opening 308, through the cup channel 306, and to the fuel channel 110. Preferably, the conduit 310 enters the assembly 10 at a 90 degree angle to the longitudinal axis 106, although those skilled in the art will recognize that the conduit 310 can enter the assembly 10 at other angles as well. The conduit 310 is preferably sufficiently flexible to allow the injector 10 to self locate in the engine head.

The upstream end 302 of the injector cup 300 has a smaller outside diameter than the downstream end 304 of the injector cup 300. Between the upstream end 302 and the downstream end 304, the injector cup 300 includes an exterior ledge or lip 312 comprised of a preferably generally planar surface which extends perpendicular to the longitudinal axis 106. The lip 312 engages the interior portion of the retaining clip 274 when the assembly 10 is fully assembled.

The downstream end 304 of the injector cup 300 includes an interior groove 314 having an outwardly tapered surface 316 which is complementary to the beveled face 120 of the retainer lip 118 on the fuel injector 100 and an inwardly tapered surface 317 which is complementary to the tapered surface 268 on the retainer sleeve 260. A lower end of the groove 314 is engageable with the retainer clip 126.

Figure 5:
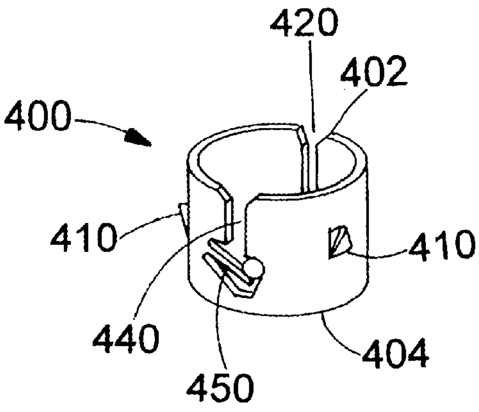
FIG. 5 is a perspective view of a first embodiment of the retaining sleeve.
Figure 6:
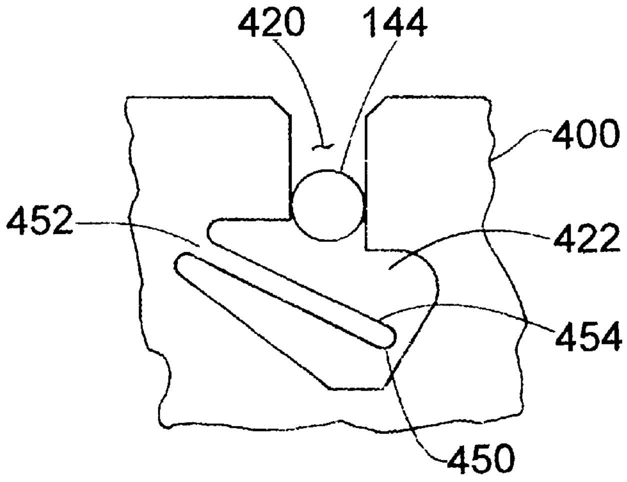
FIG. 6 is a side view of a portion of the sleeve with a retaining pin of the fuel injector inserted therein.

The fuel injector 100 is secured to the engine head 8 by the retaining sleeve 400, which is shown in FIGS. 5 and 6. The retaining sleeve 400 is preferably a single unitary sheet of metal which is stamped and then is rolled and connected, preferably by a weld (not shown). However, those skilled in the art will recognize that the ends of the retaining sleeve 400 need not necessarily be connected. The retaining sleeve 400 has an upstream end 402, a downstream end 404, and includes a plurality of retaining teeth 410 which extend outward from the longitudinal axis 106 around the outer perimeter of the retaining sleeve 400. The retaining sleeve 400 further includes a first retaining channel 420 which extends from the upstream end 402 toward the downstream end 404 a first distance, and a second retaining channel 440 which extends from the upstream end 402 toward the downstream end 404 a second distance, which is preferably farther than the first distance, with the difference between the first and second distances being at least the vertical distance D between the retaining pins 144, 146 on the fuel injector 100. Preferably, the retaining channels 420, 440 are spaced apart from each other a like distance as the retaining pins 144, 146, as described above.

The channel 420 includes a tang 450 which extends from the retaining sleeve 400 generally downstream obliquely across the channel 420 and into a securing cutout or void 422, which communicates with the channel 420. The tang 450 has a first end 452 which is connected to the retaining sleeve 400 and a second, or free end 454, which extends into the void 422. The second end 454 is biased generally upstream. The second end 454 biases the retaining pin 144 in the void 422 when the fuel injector 100 is inserted into the retaining sleeve 400. Those skilled in the art will recognize that the channel 440 includes features similar to the channel 420.

Figure 7:
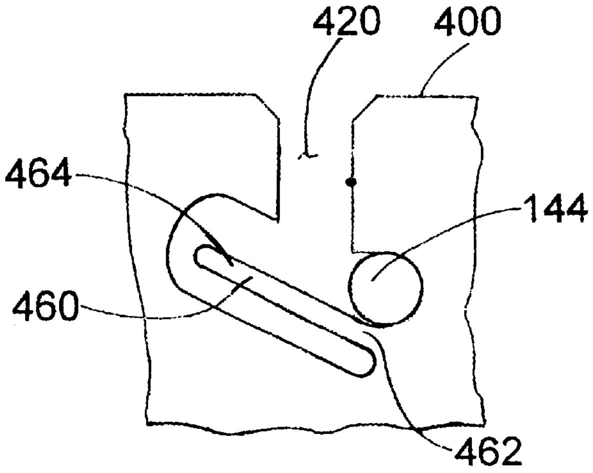
FIG. 7 is a side view of portion of a second embodiment of the sleeve with the retaining pin of the fuel injector inserted therein.

An alternate version of the retaining sleeve 400 is shown in FIG. 7, in which a tang 460 extends generally upstream obliquely across the channel 420 from the void 422. The tang 460 has a first end 462 connected to the retaining sleeve 400 from the area of the void 422, and a second, or free end 464 which is biased generally upstream. The tang 460 biases the retaining pin 144 in the void 422 when the fuel injector 100 is inserted into the retaining sleeve 400.

Figure 8:
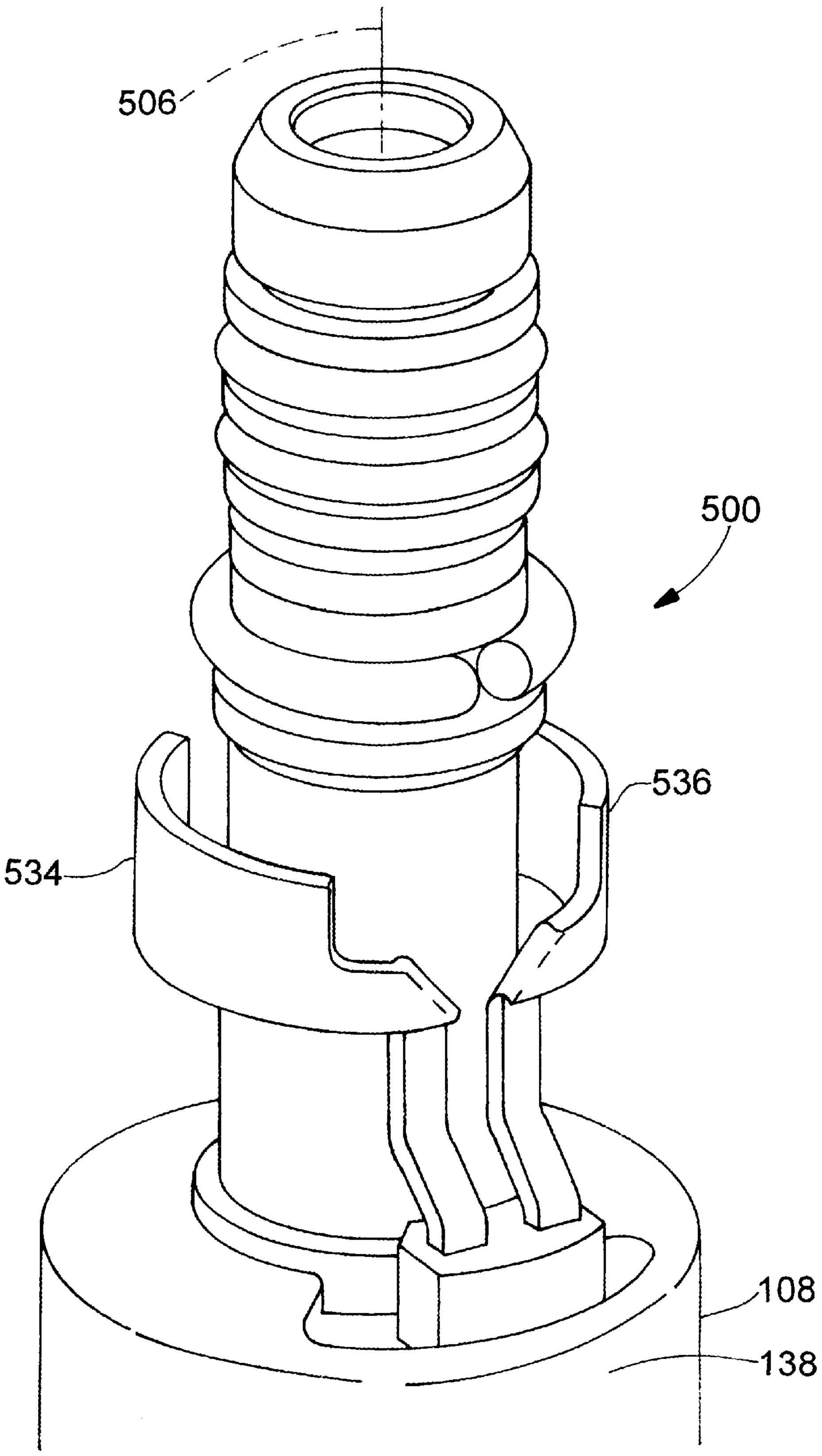
FIG. 8 is a perspective view of the top portion of a second embodiment of the fuel injector with part of the overmold removed.

An alternate embodiment of a fuel injector 500 which can be used in the present assembly is shown in FIG. 8. The alternate fuel injector 500 is preferably identical to the fuel injector 100 with the exception of the electrical contacts 134, 136. In the fuel injector 500, the electrical contacts 534, 536 extend upstream from the solenoid 138 and separate with the first electrical contact 534 going generally to the left as shown in FIG. 8 and with the second electrical contact 536 generally going to the right as shown in FIG. 8. The contacts 534, 536 are preferably generally co-planar and each extend approximately 120 degrees around the longitudinal axis 506 of the fuel injector 500. Those skilled in the art will recognize that the connector shell 200 must be correspondingly modified to electrically engage each of the electrical contacts 534, 536 with a respective shell contact 230, 240.

Installation of the assembly 10 will now be described. Initially, the retaining sleeve 400 is inserted over the downstream end 104 of the fuel injector 100 so that the retaining pin 144 is inserted into the first retaining channel 420 and the retaining pin 146 is inserted into the second retaining channel 440. In the event that the retaining pin 144 is inadvertently installed in the second retaining channel 440, the retaining pin 146 will be unable to be installed fully in the first retaining channel 420, due to the different lengths of the retaining channels 420, 440.

As the retaining pin 144 is inserted into the channel 420, the retaining pin 144 engages the tang 450 and biases the tang 450 downstream. The fuel injector 100 is then rotated relative to the retaining sleeve 400 so that the retaining pin 144 is inserted into the void 422. The biasing effect of the free end 454 of the tang 450 against the retaining pin 144 retains the retaining pin 144 against the wall of the void 422, securing the retaining pin 144 to the retaining sleeve 400. Simultaneously and similarly, the retaining pin 146 is secured to the retaining sleeve 400.

After the fuel injector 100 is filly inserted into the retaining sleeve 400, the retaining sleeve 400 and the fuel injector 100 are inserted into an orifice in the engine 8. The retaining teeth 410 engage the interior of the engine opening, securely fastening the retaining sleeve 400 to the engine.

After the retaining sleeve 400 and fuel injector 100 are secured to the engine, the connector shell 200 is next inserted over the injector cup 300. Preferably, the conduit 310 has already been inserted into the opening 308 and connected to the injector cup 300. Preferably, the conduit 310 is brazed or welded to the injector cup 300, although those skilled in the art will recognize that the conduit 310 can be connected by other methods, so long as a hermetic seal is formed between the conduit 310 and the opening 308. To insert the connector shell 200 over the injector cup 300, the downstream end 204 of the connector shell 200 is slid over the upstream end 302 of the injector cup 300. The connector shell 200 is then slid downstream until the retainer clip 274 engages and is retained by the lip 312 of the injector cup 300. The assembled connector shell 200 and injector cup 300 are then installed over the upstream end 102 of the fuel injector 100. As the assembled connector shell 200 and injector cup 300 are installed over the fuel injector 100, projection 266 engages the retainer clip 126 and compress the retainer clip 126 into the groove 120, allowing the projection 266 to progress beyond the retainer clip 126. When the projection 266 has fully traversed the retainer clip 126, the retainer clip 126 snaps back to its pre-compressed position, locking the connector shell 200 to the fuel injector 100. The retaining clip 274 retains the injector cup 300 onto the remaining parts of the assembly 10. The tapered second end 264 of the retainer sleeve 260 engages the tapered upstream surface 139 of the overmold 132 to provide a positive stop to prevent the connector shell 200 and the injector cup 300 from being inserted too far over the fuel injector 100. The seal 272 seals a gap between the retainer sleeve 260 and the injector cup 300, forming a hermetic seal between the retainer sleeve 260 and the injector cup 300.

At this point, the first shell contact 230 of the connector shell 200 is electrically engaged with the first electrical contact 134 of the fuel injector 100 and the second shell contact 240 of the connector shell 200 is electrically engaged with the second electrical contact 136 of the fuel injector 100. The o-ring 142 is partially disposed within the groove 226, forming a hermetic seal between the connector shell 200 and the overmold 132. Additionally, the o-rings 112, 114 form a hermetic seal between the fuel injector 100 and the injector cup 300. Also, the fuel conduit 310 is in fluid communication with the fuel channel 110, allowing fuel to be provided to the fuel injector 100 during operation of the engine.

To remove the assembly 10, the injector cup 300 is compressed downstream along the longitudinal axis 106. The tapered surface 317 engages the retainer clip 126 and compresses the retainer clip 126 toward the longitudinal axis 106. With the injector cup 300 pushed down and the retainer clip 126 compressed, using a removal tool (not shown), the retaining surface 274 of the connector shell 200 is pulled upstream along the longitudinal axis 106 until the projection 266 is pulled sufficiently upstream to clear the retainer clip 126. At this point, the connector shell 200 and the injector cup 300 can be removed from the fuel injector 100 together.

To remove the fuel injector 100 from the engine, the fuel injector 100 is rotated to align the retainer pins 144, 146 with their respective retaining channels 420, 440. The fuel injector 100 is then pulled upstream along the longitudinal axis 106, removing the fuel injector 100 from the engine, but leaving the retaining sleeve 400 in the engine. To reinstall the fuel injector 100 or to install a new fuel injector (not shown) the fuel injector 100 is simply inserted into the retaining sleeve 400 and rotated to lock the fuel injector 100 into the retaining sleeve 400 as described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

What is claimed is:

1. A fuel injector comprising:

a fuel metering member having a first end and a second end;

a body cincturing the fuel metering member between the first end and the second end, the body including a dielectric overmold; and at least one electrical contact at least partially circumscribing the overmold, the at least one electrical contact providing an electrical contact surface.

2. The fuel injector according to claim 1, wherein the at least one electrical contact further comprising a first and second electrical contact at least partially circumscribing the overmold, the first and second electrical contacts providing a second electrical contact surface.

3. The fuel injector according to claim 2, wherein the first and second electrical contact surfaces comprise generally annular members.

4. The fuel injector according to claim 1, further comprising a sealing element disposed downstream of the first electrical contact.

5. The fuel injector according to claim 1, further comprising first and second sealing elements each circumscribing the first end, the first sealing element being formed from a first material and the second sealing element being formed from a second material.

6. The fuel injector according to claim 5, further comprising a plurality of back-up rings, a back-up ring being located axially adjacent to each of the first and second sealing elements.

7. The fuel injector according to claim 5, further comprising a retainer at least partially circumscribing the first end, the retainer being disposed downstream of the first and second sealing elements.

8. A fuel supply assembly comprising:

an electrically actuatable fuel injector having:

a fuel metering member having a first end and a second end;

a dielectric overmold cincturing the fuel metering member; and first and second electrical contacts disposed about an outer perimeter of the overmold;

a dielectric connector shell generally surrounding at least part of the overmold, the connector shell having an outer portion and a first shell contact extending generally longitudinally proximal to the outer portion, the first shell contact having a first contact end electrically engaging the first electrical contact; and an injector cup disposed over fuel injector upstream of the overmold, the injector cup including:

a first open cup end;

a second cup end juxtaposed from the first open cup end;

a generally longitudinal cup channel extending from the first open cup end toward the second cup end, the longitudinal cup channel being in fluid communication with the fuel channel; and a generally planar surface extending generally perpendicular to the longitudinal axis.

9. The fuel supply assembly according to claim 8, wherein the connector shell further comprises a second shell contact extending generally longitudinally proximal to the outer perimeter, the second shell contact having a first contact electrically engaging the second electrical contact.

10. The fuel supply assembly according to claim 8, wherein the first and second electrical contacts are annular.

11. The fuel supply assembly according to claim 8, wherein the connector shell further comprises a retainer sleeve being press fit into an interior perimeter of the connector shell, the retainer sleeve including a projection extending generally toward the longitudinal axis.

12. The fuel supply assembly according to claim 11, wherein the fuel injector further comprises a groove disposed upstream of the overmold, the fuel supply assembly further comprising a retainer disposed at least partially within the groove between the fuel injector and the retainer sleeve, the projection engaging the retainer and releasably connecting the retainer sleeve to the fuel injector.

13. The fuel supply assembly according to claim 12, wherein the retainer sleeve further comprises a retaining surface engaged with the generally planar surface, the retaining surface retaining the injector cup on the fuel injector.

14. A method of inserting a fuel supply assembly into an engine comprising:

inserting a fuel injector into a receiving orifice in an engine;

inserting an injector cup over a first end of the fuel injector;

inserting a connector shell over the injector cup and onto the fuel injector, the connector shell including a retaining lip releasably engaging a retainer of the fuel injector and the connector shell including a retaining surface engaging the injector cup and retaining the injector cup on the fuel injector.

15. The method according to claim 14, wherein the connector shell comprises first and shell contacts, and wherein inserting the connector shell comprises electrically engaging each of the first and second shell contacts with one of the first and second electrical contacts on the fuel injector.

16. The method according to claim 14, further comprising, after inserting the connector shell, connecting a fuel supply tube to the injector cup.

17. A method of removing a fuel supply assembly from an engine, the fuel supply assembly comprising a fuel injector, an injector cup, and a connector shell, the method comprising:

displacing the injector cup in a first direction along a longitudinal axis, the injector cup engaging a retainer clip and compressing the retainer clip toward the longitudinal axis, the retainer clip releasing the connector shell;

displacing the connector shell in a second direction along the longitudinal axis;

displacing the connector shell and the injector cup together in the second direction and removing the connector shell and the injector cup from the fuel injector;

rotating the fuel injector about the longitudinal axis, disengaging the fuel injector from a retainer sleeve in the engine; and displacing the fuel injector in the second direction and removing the fuel injector from the engine.

18. A fuel injector assembly insertable into an engine head having a head opening including sidewalls, the assembly comprising:

a fuel injector; and a sleeve removably surrounding a lower portion of the fuel injector, the sleeve including a plurality of retaining teeth extending outward from the fuel injector;

wherein the sleeve is insertable into the head opening, the retaining teeth engaging the sidewalls in the head opening, and wherein, when the sleeve is inserted into the head opening, the injector is rotatable relative to the sleeve such that the injector is removable from the sleeve, the sleeve remaining in the head opening.

19. The fuel injector assembly according to claim 18, wherein the sleeve includes a plurality of channels and the injector includes a like plurality of projections extending outwardly therefrom, each projection being removably insertable into a respective channel, such that each channel releasably engages the respective projection, securing the injector to the sleeve.

20. The fuel injector assembly according to claim 19, wherein each of the plurality of channels includes a generally longitudinally extending insertion portion, a tab extending generally obliquely into the insertion portion, and a securing cutout in communication with the insertion portion and an end of the tab, the tab biasing a respective projection into the securing cutout when the injector is inserted into the sleeve.

21. The fuel injector assembly according to claim 20, wherein a free end of the tab biases the respective projection into the securing cutout when the injector is inserted into the sleeve.

22. The fuel injector assembly according to claim 20, wherein a connected end of the tab biases the respective projection into the securing cutout when the injector is inserted into the sleeve.

23. The fuel injector assembly according to claim 18, wherein the sleeve is formed from a single unitary sheet.

24. The fuel injector assembly according to claim 23, wherein the sheet is constructed from a metal.

* * * * *